(12) United States Patent
Saad et al.

(10) Patent No.: US 11,455,485 B2
(45) Date of Patent: Sep. 27, 2022

(54) CONTENT PREDICTION BASED ON PIXEL-BASED VECTORS

(71) Applicant: Adobe Inc., San Jose, CA (US)

(72) Inventors: Michele Saad, Austin, TX (US); Lauren Dest, Austin, TX (US)

(73) Assignee: Adobe Inc., San Jose, CA (US)

( * ) Notice: Subject to any disclaimer, the term of this patent is extended or adjusted under 35 U.S.C. 154(b) by 199 days.

(21) Appl. No.: 16/915,328

(22) Filed: Jun. 29, 2020

(65) Prior Publication Data
US 2021/0406593 A1  Dec. 30, 2021

(51) Int. Cl.
| | | |
|---|---|---|
| G06K 9/62 | (2022.01) | |
| G06N 3/02 | (2006.01) | |
| G06F 16/538 | (2019.01) | |
| G06V 10/56 | (2022.01) | |

(52) U.S. Cl.
CPC ......... *G06K 9/6215* (2013.01); *G06F 16/538* (2019.01); *G06N 3/02* (2013.01); *G06V 10/56* (2022.01)

(58) Field of Classification Search
None
See application file for complete search history.

(56) References Cited

U.S. PATENT DOCUMENTS

| | | | | |
|---|---|---|---|---|
| 9,916,613 | B1 * | 3/2018 | Dorner | G06Q 30/0631 |
| 10,109,051 | B1 * | 10/2018 | Natesh | G06V 10/56 |
| 2017/0048419 | A1 * | 2/2017 | Moroney | H04N 1/6008 |
| 2020/0394849 | A1 * | 12/2020 | Barker | G06F 3/04847 |

OTHER PUBLICATIONS

Koehrsen, Will, "Neural Network Embeddings Explained, How Deep Learning Can Represent War and Peace as a Vector", Towards Data Science, https://towardsdatascience.com/neural-network-embeddings-explained-4d028e6f0526?gi=d194bb9ccbc1, Oct. 2, 2018, 13 pages.

Kiela, Douwe, "Learning Image Embeddings Using Convolutional Neural Networks for Improved Multi-Modal Semantics", Proceedings of 2014 Conference Empiricial Methods in Natural Language Processing, Association for Computational Linguistice, Oct. 2014, 10 pages.

Rubner, Yossi, et al, "Adaptive Color-Image Embeddings for Database Navigation", Computer Visiona—ACCV '98: Third Asian Conference on Computer Vision Hong Kong, China, 1998 Proceedings vol. 1, Jan. 8-10, 1998, 8 pages.

* cited by examiner

*Primary Examiner* — David Perlman
(74) *Attorney, Agent, or Firm* — Kilpatrick Townsend & Stockton LLP

(57) ABSTRACT

Methods and systems disclosed herein relate generally to systems and methods for predicting content based on vector data structures generated from image pixels. A content-prediction application accesses a color palette having two or more color-palette categories and selects a first color of the color palette. The content-prediction application generates a first vector based on a set of pixel values that represent the first color of the color palette. The content-prediction application determines a distance metric between the first vector and a second vector, in which the second vector is identified by applying a convolutional neural network model on an image depicting an item that includes a second color. In response to determining that the distance metric is less than a predetermined threshold, the content-prediction application selects the content item corresponding to the second vector.

17 Claims, 7 Drawing Sheets
(1 of 7 Drawing Sheet(s) Filed in Color)

CONTENT PREDICTION BASED ON PIXEL-BASED VECTORS

TECHNICAL FIELD

This disclosure generally relates to methods that facilitate prediction of content based on vector data structures generated from image pixels. More specifically, but not by way of limitation, this disclosure relates to applying machine-learning models to pixels of an image to generate coordinate values of the vectors for prediction of content.

BACKGROUND

Image-search systems generally involve processing a search query containing a plurality of words and performing a database search operation to identify a plurality of images having characteristics that match one or more keywords of the search query. The search query may include a natural text string, in which the image-search systems may segment the text string into one or more keywords that identify the characteristics of the images for retrieval.

Reverse image search is a content-based image retrieval query technique that involves an image-search system receiving a sample image or a hyperlink to the sample image, extract one or more features, and perform a database search based on the extracted features. By using the extracted features, reverse image search facilitates identification of images that include similar content as the sample image.

SUMMARY

According to certain embodiments, a content-prediction application accesses a color palette having two or more color-palette categories and selects a first color of the color palette. The content-prediction application generates a first vector based on a set of pixel values that represent the first color of the color palette. The content-prediction application determines a distance metric between the first vector and a second vector, in which the second vector is identified by applying a convolutional neural network model on an image depicting an item that includes a second color. The content-prediction application determines that the distance metric between the first and second vectors is less than a predetermined threshold, in which the predetermined threshold indicates a degree of color similarity between the first vector and second vector. In response to determining that the distance metric is less than a predetermined threshold, the content-prediction application selects the content item corresponding to the second vector. The content-prediction application generates, for output on a user interface, an item catalog that includes the selected item.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Features, embodiments, and advantages of the present disclosure are better understood when the following Detailed Description is read with reference to the accompanying drawings.

Figure 1:
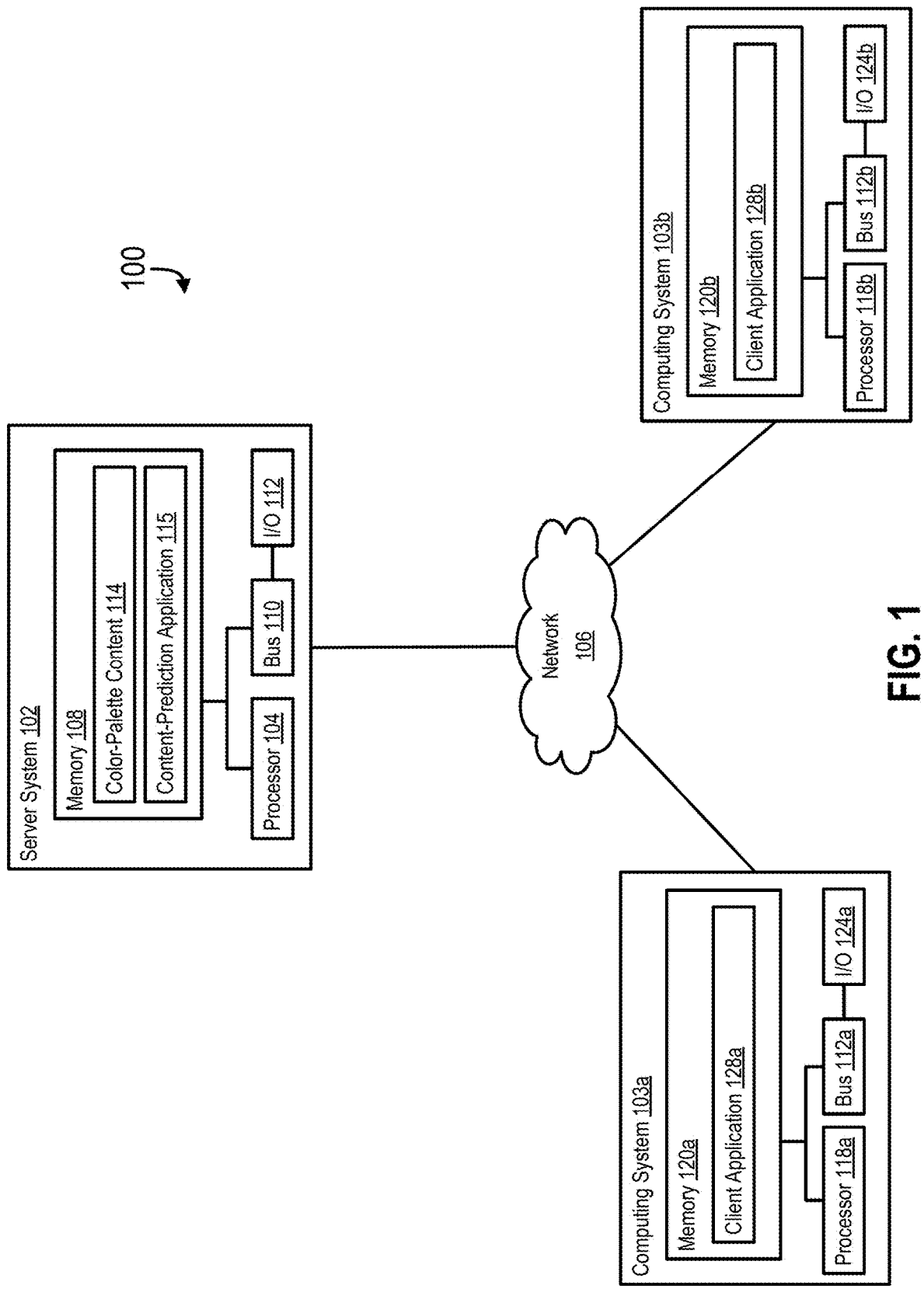
FIG. 1 illustrates a computing environment for predicting content based on pixel-based vectors in accordance with some embodiments.

The patent or application file contains at least one drawing executed in color. Copies of this patent or patent application publication with color drawing(s) will be provided by the Office upon request and payment of the necessary fee.

DETAILED DESCRIPTION OF THE INVENTION

Conventional image-search systems are limited to identifying images that include features that directly correspond to the keywords or features extracted from a search query (e.g., text string, images). For example, a search engine can identify an item having a color that matches the color specified in keywords previously submitted by the user. For reverse image search techniques, only images that have the same features as the sample image can be retrieved. The conventional techniques thus do not otherwise identify content that are different but still could be relevant to the image submitted by the user. In addition, it is challenging to automatically identify data objects that satisfy parameters (e.g., images arranged in specific color proportions) inferred from the preference of the user. This includes identifying content that includes colors arranged into specific proportions that matches the preference of the user.

Accordingly, prior database systems generally do not accommodate identifying content from specific parameters without using complex set of search-syntax commands. Thus, prior techniques are typically time consuming, inaccurate, and inefficient with respect to identifying color information that would accommodate specific color usage patterns and preferences of a user. Moreover, inferring patterns and proportions of different colors for content search can be difficult because a preference of a user can vary over time.

Certain embodiments described herein can address these problems by providing prediction of content based on vector data structures generated from image pixels. A content-prediction application accesses a color palette that includes colors from two or more color-palette categories. In some instances, the colors of the color palette are predicted based on interaction data associated with a user. The color palette may correspond to a particular color scheme specified by a user. For example, a user accesses a website that provides advertising for clothing items. The content-prediction application identifies a color palette that matches the color preference of the user. The color preference is determined by identifying a set of colors derived from historical activity of the user. In this example, the color preference corresponds to a warm-color scheme.

After the color palette has been identified, the content-prediction application converts one or more colors of the color palette into a set of color-palette vectors for a color-embedding space. Specifically, the content-prediction application selects a first color from a color-palette category of the color palette. A set of pixel values that characterize the first color can be identified and generate a first vector (hereinafter "color-palette vector") that represents the first color at a first location within a color-embedding space. In some embodiments, the color-embedding space corresponds to a statistical space in which two vectors can be compared to determine a degree of similarity. The process of converting the color to a corresponding color-palette vector can be repeated for other colors of the color palette, such that the color-embedding space includes the set of color-palette vectors that correspond to the colors of the color palette. In some instances, the content-prediction application applies a weight parameter to one or more color-palette vectors of the color palette based on their respective color-palette categories.

The content-prediction application identifies content vectors that are within a predetermined distance (e.g., a distance metric indicating nearest neighbor) from each of the color-palette vectors that represent the colors of the selected color palette. In some instances, the content-prediction application identifies content vectors for each color-palette vector of the color palette, such that content items that match at least one color of the color palette can be identified. In some embodiments, each content vector represents a content item that is associated with a particular content type and includes colors that match one or more colors of the color palette. The content-prediction application can generate each of the content vectors by accessing pixel values of each image representing the content, then applying a convolutional neural network to derive values that represent a location of the content vector within the color-embedding space. The content vector can be further applied with a weight parameter, based on a type of color-palette category that is applicable to the content item. Referring to the above example, a content vector in the color-embedding space may be an image that represents a clothing item. To compare the content vector and the color-palette vector, a distance metric corresponding to a degree of similarity between the two vectors can be determined. In some instances, the distance metric is an Euclidean distance or a cosine similarity metric between the two vectors.

The content-prediction application selects at least one content vector if the distance metric calculated between the vector and the color-palette vector is below a predetermined threshold. A content item corresponding to the at least one content vector can be identified and presented to a user, in which the content includes one or more colors that match the colors of the color palette. In some instances, the content items are aggregated into a catalog (for example) and presented to a user interface. Referring to the above example, the clothing items that are represented by the identified content vectors can be accessed and presented on a first page of a website, at which the user can view and purchase the recommended clothing items.

Accordingly, one or more colors of the color palette can be encoded as vectors in the color-embedding space. The vectors can be compared with other vectors in color-embedding space that represent content, e.g., items in an item catalog. A set of vectors located within a predetermined distance of those of the colors can be identified. A set of content objects that are represented by the respective set of vectors can be retrieved, at which the content objects can be recommended to the user. In some instances, a user interface is modified such that user interface elements depicting the content objects can be arranged for display at a more visible portion of the user interface.

In some instances, one or more colors of the color palettes are selected by a user via a user interface. The selection of the color palettes can be based on a particular color scheme, such as cool, warm, and bright. In some instances, the color palettes are selected based on a non-color category, such as a season or weather category (e.g., spring), a location category (e.g., beach), and an event category (e.g., New Year's Day). For example, the user interface displays a number of preconfigured color palettes, at which the user may select one of the color palettes based on her or his preference. Each color palette may include a main color-palette category that corresponds to the highest proportion of colors in the color palette, a neutral color-palette category that corresponds to a lower proportion of colors relative to the main color-palette category, and an accent color-palette category that corresponds to the lowest proportion of colors relative to the main color-palette category and a neutral color-palette category. The user interface may present the color palette based on the proportion of its colors. In some instances, the user interface displays a number of color schemes and presents a set of color palettes in response to a selection of a particular color scheme. The user may select a color palette from the set, such that content items that match one or more colors of the color palette can be identified.

In some instances, a type of item is inferred based on the color-palette category of the color palette. For example, a first type of item (e.g., a sofa) can be selected by correlating the first type with the main color-palette category, a second type of item (e.g., a rug) can be selected by correlating the second type with the neutral color-palette category, and a third type of item (e.g., a lamp) can be selected by correlating the third type with the accent color-palette category. The type of item selected of a particular color-palette category can be inferred based on a size of the item, a user query submitted in an item catalog database, and the like. Additionally or alternatively, user-interface elements representing the content items can be relocated based on a selection of a particular color palette. For example, a web page that displays the item catalog can automatically relocate presentation of user-interface elements, such that a first part of the web page depicts content items having a color that is associated with the main color-palette category, a second part of the web page depicts content items having another color that is associated with the neutral color-palette category, and so forth. In some instances, the user interface displays a number of content items that are proportional to the type of the color-palette category. For example, the user interface displays a large number of content items that are associated with the main color-palette category, while displaying a smaller number of content items that are associated with the neutral color-palette category.

As a result, the user interface can display content items that correspond to color palette preference of the user. The user may "refresh" the user interface to rearrange and/or reselect the content items that are based on the same or different color palette. For example, the user interface rearranges the content items within the results in response to a user action, if the user does not find a product she or he is interested in, but still prefers to remain within the same color-palette (or section of the palette) and explore additional content items.

In some instances, the content-item prediction is implemented in addition to an existing recommendation system. For example, a color palette can be selected using collaborative filtering techniques, in which data used to indicate the color-palette preference can be based on historical data accessed from other users.

Certain embodiments described herein improve existing database systems by predicting data objects based on vector data structures derived from image pixels. Processing a plurality of image pixels to generate a vector in an embedding space can facilitate accurate prediction of data objects that substantially match various color parameters in a search query. By utilizing color palettes as a search query instead of text strings, various combinations of search parameters can be configured without requiring complex syntax rules, such as specifying a certain percentage of pixels to be present in an image-search result. A particular type of a content item can be inferred based on a color category associated with the color palette, which cannot be implemented based on reverse image search which requires exact matching of extracted features. Further, prediction of data objects by converting a plurality of images into vectors in the embedding space not only improves transmission rate of data retrieval, but also increases an efficient use of computing resources to store and process images in network environments. As a result of the above, an improvement of database systems can be achieved based on one or more implementations of predicting content based on vector data structures generated from image pixels.

In addition to improvement of database systems, automatic relocation of user-interface elements (e.g., icons, interactive images, hyperlinks) based on the prediction of data objects as described in one or more embodiments improves existing user-interface systems. The relocation of a user-interface element based on a corresponding color category of the color palette to another portion of the user interface improves accessibility and efficiency of retrieving content. Accordingly, an improvement of user-interface systems can be achieved based on automatic relocation of user-interface elements based on prediction of content items in response to a color-palette selection.

Computing Environment

FIG. 1 illustrates a computing environment 100 for predicting content based on pixel-based vectors in accordance with some embodiments. The exemplary computing systems include a server system 102 and computing systems 103a and/or 103b in communication via a network 106.

The server system 102 comprises a computer-readable medium such as a processor 104 that is communicatively coupled to a memory 108 and that executes computer-executable program instructions and/or accesses information stored in the memory 108. The processor 104 may comprise a microprocessor, an application-specific integrated circuit ("ASIC"), a state machine, or other suitable processing device. The processor 104 can include any of a number of computer processing devices, including one. Such a processor can include or may be in communication with a computer-readable medium storing instructions that, when executed by the processor 104, cause the processor to perform the steps described herein.

The server system 102 can provide access to the color-palette content 114. The color-palette content 114 may be stored in any suitable computer-readable medium and execute on any suitable processor. In some embodiments, the color-palette content 114 is stored in the memory 108 at the server system 102. The color-palette content 114 can be accessed by the server system 102 from a remote location via a network 106 and provided to computing systems 103a and 103b. The color-palette content 114 may include a plurality of color palettes that can be transmitted by the server system 102 to the computing systems 103a and 103b. In some embodiments, the color-palette content 114 is generated by the server system 102 or by another system (e.g., application servers). Based on the selection of the color palette, the server system 102 may predict content that include colors matching one or more colors of the selected color palette.

A content-prediction application 115 stored in the memory 108 can configure the processor 104 to manage and provide access to the color-palette content 114. The content-prediction application 115 can configure the processor 104 to access some or all of the color-palette content 114 stored in the memory 108 or any other suitable computer-readable medium.

The content-prediction application 115 may provide a social media service, a cloud service, or other network service providing access to the color palettes as well as identifying a set of items that match the color palette. A cloud service can include a collection of computing resources, including computing systems and/or applications, that can be provided as an online service via a data network. The collection of computing systems and/or hardware can be represented as a single service. The cloud service can provide a digital hub for browsing, creating, sharing, and otherwise using electronic content using one or more applications provided via the cloud service.

In some instances, the content-prediction application 115 accesses and transmits color palettes in response to one or more selections performed by a user (e.g., the user of the computing system 103a). The content-prediction application 115 may also predict the color palettes based on previous interaction data associated with the user. For example, the interaction data associated with the user are retrieved from browsing data stored in computing system 103a. The color palette may correspond to a particular color scheme, including bright-color scheme and cool-color scheme.

The content-prediction application 115 may access the color palette selected by the content-prediction application 115 and use the color palette to predict content for the user. The content-prediction application 115 identifies pixel values that characterize each color of the color palette and generate a color-palette vector based on the pixel values. The color-palette vector include values that identify a first location within a color-embedding space. The content-prediction application 115 may calculate a distance metric between a color-palette vector with a content vector associated with the color-embedding space. Based on the distance metric, the content-prediction application 115 can predict content that matches one or more colors of the color palette.

The server system 102 may also comprise a number of external or internal devices such as input or output devices. For example, the server system 102 is shown with an input/output ("I/O") interface 112. A bus 110 can also be included in the server system 102. The bus 110 can communicatively couple one or more components of the server system 102.

FIG. 1 also illustrates the content-prediction application 115 comprised in the memory 108 of the server system 102. The content-prediction application 115 can include one or more modules. The content-prediction application 115 can configure the server system 102 to access, modify, transmit, or otherwise use the color-palette content 114 in response to input provided by the client applications 128a and/or 128b. For example, the client application 128a transmits a query to retrieve a color palette of the color-palette content 114, at which the server system 102 may access the color palette by processing the query through a database system.

The content-prediction application 115 can also configure the server system 102 to allow multiple computing systems 103a and/or 103b or other client systems to access or otherwise use some or all of the color-palette content 114. In some embodiments, the content-prediction application 115 stores data in the memory 108 identifying client accounts via which the client applications 128a and/or 128b can access the content-prediction application 115. In other embodiments, the content-prediction application 115 accesses data from a remote data source that identifies client accounts via which the client applications 128a and/or 128b can access the content-prediction application 115. The content-prediction application 115 can store data describing associations between client accounts and items of the color-palette content 114.

The server system 102 can include any suitable computing system for hosting the content-prediction application 115. In one embodiment, the server system 102 may be a single computing system. In another embodiment, the server system 102 may be a virtual server implemented using a number of computing systems connected in a grid or cloud computing topology.

Each of the computing systems 103a and/or 103b comprises a computer-readable medium such as processors 118a and/or 118b, respectively. Each of the processors 118a and/or 118b is communicatively coupled to a memory 120a and/or 120b, respectively. Each of the processors 118a and/or 118b respectively executes computer-executable program instructions and/or accesses information stored in the memory 120a and/or 120b. Each of the processors 118a and/or 118b may comprise a microprocessor, an ASIC, a state machine, or other processor. Each of the processors 118a and/or 118b can include any of a number of computer processing devices, including one. Such a processor can include or may be in communication with a computer-readable medium. The computer-readable medium stores instructions that when executed by the processor, cause the processor to perform the steps described herein.

The computing systems 103a and/or 103b may also comprise a number of external or internal devices such as a mouse, a CD-ROM, DVD, a keyboard, a display, audio speakers, one or more microphones, or any other input or output devices. For example, each of the computing systems 103a and/or 103b is respectively shown with input/output ("I/O") interfaces 124a, 124b and display devices 126a, 126b. Buses 122a, 122b can be respectively included in the computing systems 103a and/or 103b. Each of the buses 122a, 122b can communicatively couple one or more components of the computing systems 103a and/or 103b.

FIG. 1 also illustrates the client applications 128a and/or 128b respectively comprised in the memory 120a and/or 120b of the computing systems 103a and/or 103b. Each of the client applications 128a and/or 128b can include one or more software modules. The client applications 128a and/or 128b can respectively configure the processors 118a and/or 118b to modify or otherwise access the color-palette content 114 provided by the server system 102 via the network 106. The client applications 128a and/or 128b can respectively configure the processors 118a and/or 118b to respectively render some or all of the color-palette content 114 and predicted content generated by the content-prediction application 115 for display at their respective display devices. For example, each of the client applications 128a and/or 128b is an internet browser application, a social media application, and the like. A network session for accessing or otherwise modifying the color-palette content 114 can be established by the client applications 128a and/or 128b via the network 106 between computing systems 103a and/or 103b and the server system 102.

In some embodiments, the computing systems 103a and/or 103b include any suitable client devices for communicating via a network 106 and executing the client applications 128a and/or 128b. Non-limiting examples of a computing device include a desktop computer, a tablet computer, a smart phone, or any other computing device suitable for using electronic content. In other embodiments, the computing systems 103a and/or 103b include server systems for providing electronic content items via the client applications 128a and/or 128b.

Process for Predicting Content Based on Color-Palette Preference

Figure 2:
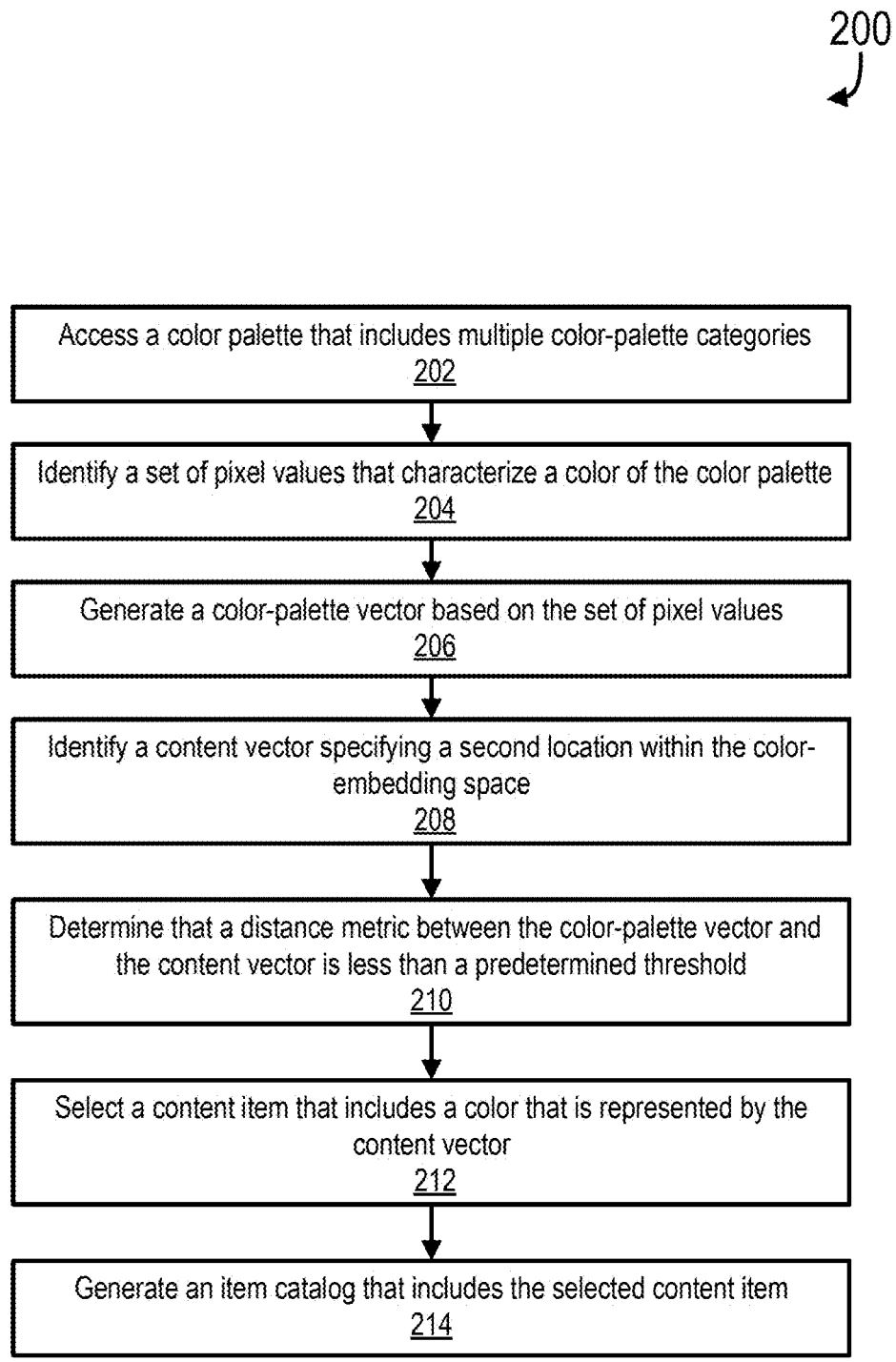
FIG. 2 illustrates a process for predicting content based on pixel-based vectors in accordance with some embodiments.

FIG. 2 illustrates a process 200 for predicting content based on pixel-based vectors in accordance with some embodiments. For illustrative purposes, the process 200 is described with reference to the components illustrated in FIG. 1, though other implementations are possible. For example, the program code for content-prediction application 115 of FIG. 1, which is stored in a non-transitory computer-readable medium, is executed by one or more processing devices to cause the server system 102 to perform one or more operations described herein.

At step 202, a content-prediction application (e.g., the content-prediction application 115 of FIG. 1) accesses a color palette that includes multiple color-palette categories. The color palette includes multiple colors that can be used to predict content. The color palette may include three different color-palette categories, including a main color-palette category, a neutral color-palette category, and an accent color-palette category. In some instances, the content-prediction application receives previous interaction data indicative of historical user activity that occurred via a browser application. The previous interaction data may include color-layout data of a web page and/or one or more image objects to which at least some of the historical user activity was directed. In the case of image objects, the content-prediction application may extract pixel values of each image object, such that a machine-learning model may identify multiple colors (e.g., two or more colors) used to identify a color-palette preference of the user.

In some instances, the content-prediction application applies a machine-learning model, such as a neural network, to the previous interaction data to infer the color-palette preference of the user associated with the previous interaction data. For example, each accessed web page indicated by the previous interaction data is processed to generate a vector in an embedding space, in which the plotted vectors can be used to infer the color-palette preference of the user. The content-prediction application determines and accesses the color palette having colors that match the inferred color-palette preference.

In some instances, the color palette is selected through one or more user-interface actions performed by a user. For example, a set of color palettes are presented to the user. The set of color palettes may be categorized into different color schemes, including a warm-color scheme, a cool-color scheme, and a bright-color scheme. In some instances, the color palettes are selected based on a non-color category, such as a season or weather category (e.g., spring, winter), a location category (e.g., beach, city), and an event category (e.g., New Year's Day, birthday). The user can select a color palette from the set of color palettes through a user action performed via the user interface. In some instances, the set of color palettes are presented as a multi-faceted search, in which the user interface can generate a first set of items when the user performs a selection of a particular color palette on the user interface. The first set of items can be added or replaced with a second set of items when the user performs another selection of another color palette on the user interface. In some instances, the user selects multiple color palettes which the system identifies sets of items that correspond to one or more color of the multiple color palettes.

At step 204, the content-prediction application identifies a set of pixel values that characterize a color of the color palette. The color can be represented by the set of pixel values across different color channels and may formatted in different color models, including RGB, LMS, and CMYK models. In some instances, the color identified by the set of pixel values is selected based on its color-palette category. For example, the set of pixel values are identified for a color that is associated with a main color-palette category. Additionally or alternatively, multiple sets of pixel values can be identified for respective colors in the color palette.

At step 206, the content-prediction application generates a color-palette vector based on the set of pixel values, in which the color-palette vector represents the color at a first location within a color-embedding space. In some instances, a trained neural network model is applied to the set of pixel values to derive a set of graph coordinates for identifying the location of the color-palette vector at the color-embedding space. In some instances, a color-palette vector is generated for other remaining colors of the color-palette, such that a set of multiple color-palette vectors represent the selected color palette. Additionally or alternatively, the color-palette vector is applied with a weight parameter, in which its value depends on a type of the color-palette category (e.g., a main color-palette category) associated with the particular color.

At step 208, the content-prediction application identifies a content vector specifying a second location within the color-embedding space. The content vector identifies a color signature of the a content item retrieved from a database (e.g., an item-catalog database). In some instances, the content-prediction application successively performs a convolution, a non-linearity conversion (e.g., Rectified Linear Unit (ReLU)), a pooling or sub sampling, and a classification (Fully Connected Layer) operations, which form a single convolutional layer. The content-prediction application may apply a plurality of convolutional layers to an image of the content item to generate the content vector used to predict whether the content item includes colors that match the selected color palette. In some instances, the content-prediction application identifies multiple content vectors that represent the same content item, in which the content item is identified to include multiple colors. Additionally or alternatively, the content vector is applied with the weight parameter, in which its value depends on a type of the color-palette category (e.g., a main color-palette category) applicable to the content item. The value of the weight parameter can be identical to the value applied for the color-palette vector.

At step 210, the content-prediction application determines that a distance metric between the color-palette vector and the content vector is less than a predetermined threshold. To determine that the distance metric is less than the predetermined threshold, the distance metric between two vectors in the color-embedding space can be calculated, in order to identify a degree of similarity between the color of the color palette and the color signature of the content item. In some embodiments, the predetermined threshold indicates a likelihood that the two colors that are substantially similar. The distance metric can be a cosine distance, an Euclidean distance, Minkowski distance, and/or Hamming distance. If the content item is represented by set of content vectors, the content-prediction application calculates a distance metric between each of the set of content vectors and the nearest color-palette vector in the color embedding space, thereby generating a set of distance metrics. An average or a median value of the set of distance metrics can be calculated, which is then identified whether such value is less than the predetermined threshold.

At step 212, the content-prediction application selects a content item that includes a color that is represented by the content vector in response to determining that the distance metric being less than the predetermined threshold. For example, a first clothing item (e.g., a jacket) that is represented by the content vector is identified. In another example, a second clothing item (e.g., a patterned sofa) is identified based on determining that the average or median value of the set of distance metrics is below the predetermined threshold. [0051] At step 214, the content-prediction application generates, for output on a user interface, an item catalog that includes the selected content item. In some instances, an item catalog is generated to include one or more content items that include colors that substantially match one or more colors associated with the color palette. The item catalog may include a set of items in different categories. User-interface elements (e.g., icons, interactive images, hyperlinks) corresponding to the identified items can be automatically relocated in the user interface in a manner that items regarded as closest to a particular color of the color palette can be placed on a visible portion of the user interface (e.g., a web page rendered by a browser application).

In some instances, the layout of user-interface elements is customized such that content items can be presented on the user interface based on the color-palette categories of the color palette. For example, a first set of content items in the layout that correspond to a color of a main color-palette category are displayed in a more visible portion of the user interface. A second set of content items in the layout that correspond to another color of a neutral color-palette category can be displayed in a less visible portion of the user interface. In some instances, the user interface displays a number of content items that are proportional to the type of the color-palette category. For example, the user interface displays a large number of content items that are associated with the main color-palette category, while displaying a smaller number of content items that are associated with the neutral color-palette category.

The steps in FIG. 2 can be repeated based on a user action on the user interface. For example, the user may "refresh" the user interface to rearrange and/or reselect the content items that are based on the same or different color palette. In particular, the user interface rearranges the content items within the results in response to a user action, if the user does not find a product she or he is interested in, but still prefers to remain within the same color-palette (or section of the palette) and explore additional content items. Process 200 terminates thereafter.

Example Color Palette

Figure 3:
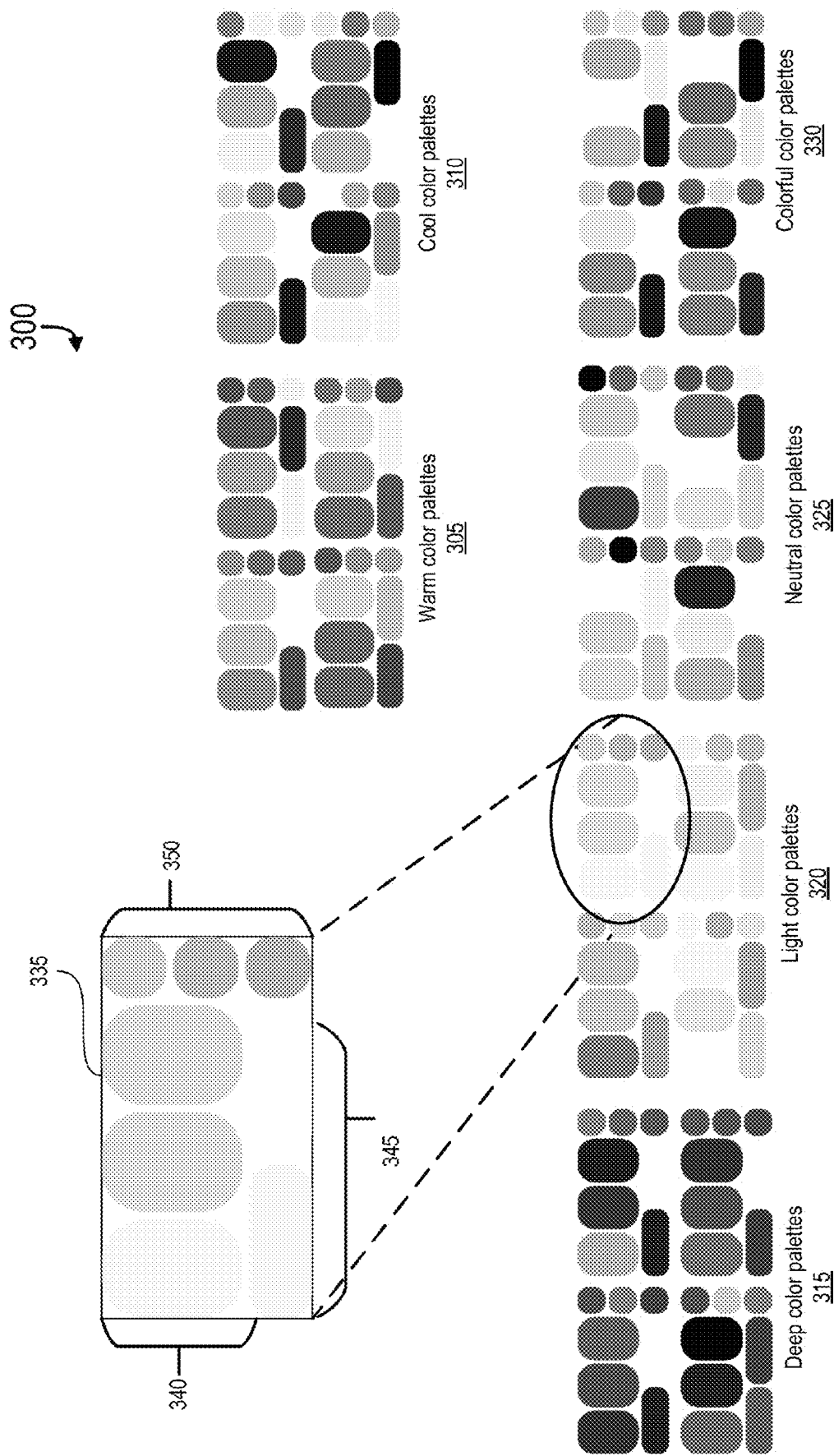
FIG. 3 illustrates a set of color palettes in accordance with some embodiments.

FIG. 3 illustrates a set of color palettes 300 in accordance with some embodiments. A set of color palettes can be accessed from a server system (e.g., the server system 102 of FIG. 1) and presented on a user interface of a client application of a client system (e.g., the client system 103A of FIG. 1). The set of color palettes 300 can be divided into multiple color schemes. The color scheme may group colors palettes in different color combinations to emit a particular visual effect. For example, the color scheme includes a warm-color scheme 305, a cool-color scheme 310, a deep-color scheme 315, a light-color scheme 320, a neutral-color scheme 325, a colorful-color scheme 330, and so on. In some instances, the user interface displays a number of color schemes and presents multiple color palettes in response to a selection of a particular color scheme. The user may select a color palette thereafter, such that one or more items that match one or more colors of the color palette can be identified.

A color palette selected from a particular color scheme may include at least two color-palette categories. Referring to FIG. 3, a color palette 335 includes three color-palette categories: (i) a main color-palette category 340; (ii) a neutral color-palette category 345; (iii) and an accent color-palette category 350. The main color-palette category may include one or more colors that represent the primary color of the color palette. In some instances, the primary color of the color palette is identified based on a color preference of the user. The neutral color-palette category may include one or more colors that support and balance the colors from the main color-palette category. The accent color-palette category may include one or more colors that add variety to the colors of the main color-palette category and the neutral color-palette category.

In some embodiments, the color palette includes one or more rules that specifies the proportions of colors that should be depicted for a selected item. For example, the color palette includes a rule specifying colors from the main color-palette category should be at a higher proportion (60%) than colors from the neutral color-palette category (30%) and color from the accent color-palette category (10%). One ordinarily skilled in the art can appreciate that other ratios of color proportionality can be used. The user interface may present the color palette in a manner that reflects upon a proportion of colors in each color-palette category.

After the color palette is selected, different types of items can be identified based on colors associated with color-palette categories of the color palette. In particular, proportions of a color at a particular color-palette category can be used to determine a type of item. For example, a first clothing item (e.g., a jacket, pants) corresponds to a color that is associated with the main color-palette category of the color palette. A second clothing item (e.g., hats) may correspond to a color that is associated with the neutral color-palette category of the color palette. An accessory item (e.g., shoes) may correspond to a color that is associated with the accent color-palette category of the color palette. Based on the above example, a type of the identified items can be based on a particular color-palette category.

In some instances, an item catalog is generated to include one or more items that include colors that substantially match one or more colors associated with the selected color palette. The item catalog may include a set of items in different categories. User-interface elements (e.g., icons, interactive images, hyperlinks) corresponding to the identified items can be automatically relocated in the user interface in a manner that items regarded as closest to a color of the color palette can be placed on the top of the catalog. In some instances, an item that includes a large proportion of color that matches a color of the main color-palette category is placed at a particular position of the generated item catalog. Another item that includes smaller proportion of color that matches the color of the main color-palette category can be placed at a lower position relative to the particular position corresponding to the item.

Selecting Color Palettes Based on Previous Interaction Data

Although the color palette is selected through one or more user-interface actions performed by a user, it can also be advantageous to select the color palettes based on a color-palette preference predicted for the user. The predicted color-palette preference can be identified based on processing previous interaction data tracked for the user (e.g., web pages accessed by the user). The color-palette preference can be predicted by analyzing layout data extracted from the interaction data or by applying a trained neural network model to the previous interaction data of the user.

(a) Identifying Color-Palette Preference Based on Layout Data

Figure 4:
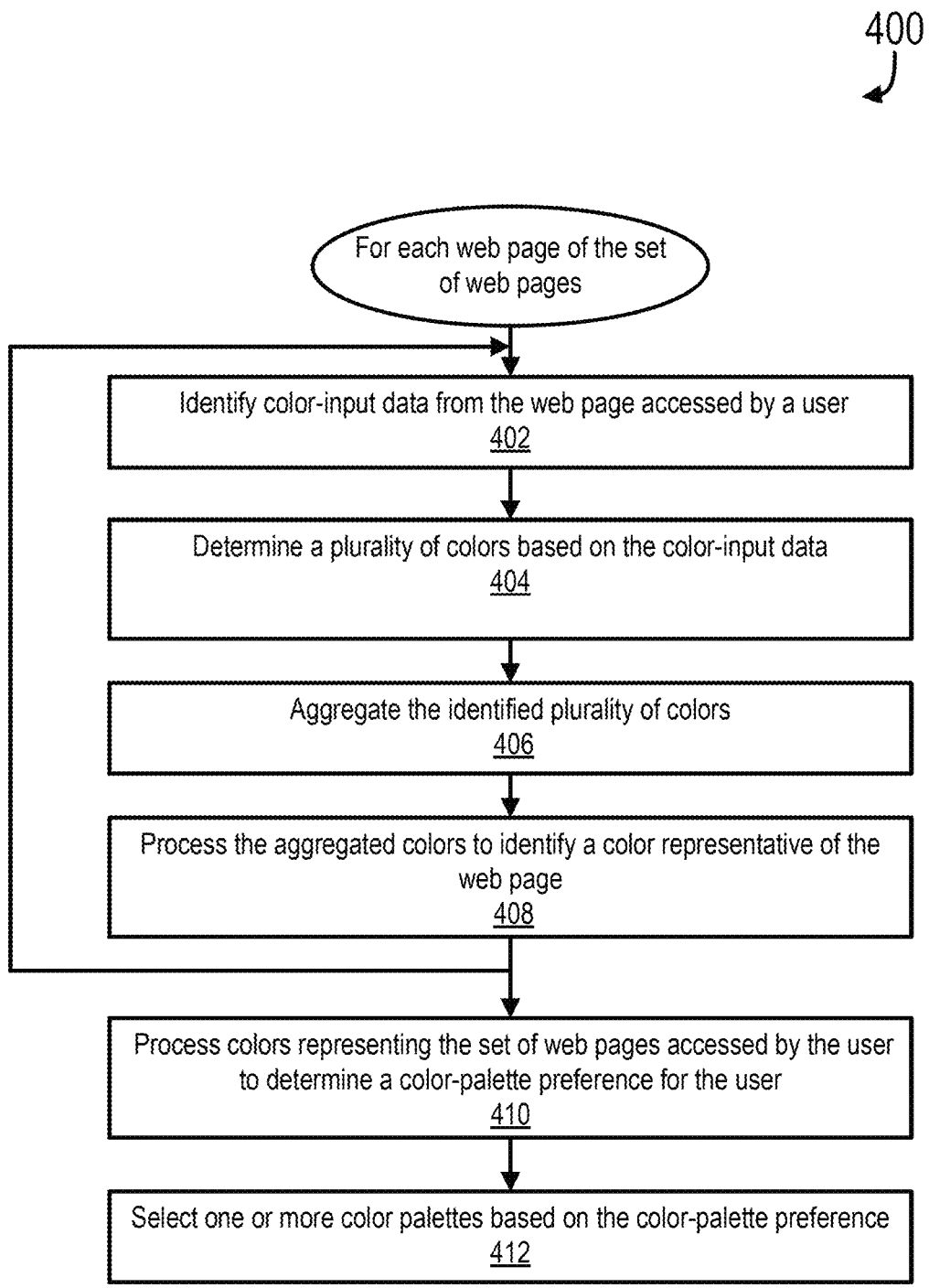
FIG. 4 illustrates a process for selecting color palettes based on layout data extracted from previous interaction data in accordance with the embodiments.

FIG. 4 illustrates a process 400 for selecting color palettes based on layout data extracted from previous interaction data in accordance with the embodiments. For illustrative purposes, the process 400 is described with reference to the components illustrated in FIG. 1, though other implementations are possible. For example, the program code for content-prediction application 115 of FIG. 1, which is stored in a non-transitory computer-readable medium, is executed by one or more processing devices to cause the server system 102 to perform one or more operations described herein.

At step 402, a content-prediction application (e.g., the content-prediction application 115 of FIG. 1) identifies color-input data from a web page of a set of web pages accessed by a user (e.g., the client application 128a of FIG. 1). The set of web pages represent previous interaction data which indicate historical user activity of the user. For example, the content-prediction application accesses a URL of a web page and identify image files based on their respective file extensions (e.g., jpeg, jpg, png). The identification of the image files can be facilitated based on a tag identifier of a document object model. Additionally or alternatively, the content-prediction application may parse a portion of the web page to extract the layout data for the web page, from which the color-input data can be identified. The portion can be configured based on the tag identifier and/or a particular location of the portion in the webpage. In some instances, the content-prediction application accesses the URL and retrieves cascading style sheet (CSS) files embedded in the URL.

At step 404, the content-prediction application determines a plurality of colors from the color-input data. If the color-input data include image objects identified from the web page, the plurality of colors can be identified based on pixels values (e.g., RGB value, color hex code) corresponding one or more pixels of the image objects. If the color-input data include CSS files of the web page, the content-prediction application can determine the plurality of colors by parsing the web page to identify content associated with particular tag properties (e.g., style). The identified content for each tag can be processed to identify the color that is included in the web page.

At step 406, the content-prediction application aggregates the identified colors (e.g., the color codes). In some instances, the color codes is stored in an array data structure, in which each index value of the array corresponds to the color code identified from the web page. In case of image objects retrieved from the web page, pixels of each of the image objects can be accessed to identify a set of colors that are aggregated for the web page. In some instances, each color of the set of colors of the image object is counted to identify a single color value representative of the image object (e.g., most frequently occurring color value in the image object).

At step 408, the content-prediction application processes the aggregated colors to identify a color representative of the web page. For example, the most frequently appearing color in the aggregated colors is selected as the color representative of the web page. In some instances, the most frequently appearing color based on a subset of the aggregated colors (e.g., colors corresponding to the extracted image objects) is selected as the color representative of the web page. In some instances, the palette-selection repeats steps 402 to 408 to identify the colors that represent the respective web pages of the set.

At step 410, the content-prediction application processes colors representing the set of web pages accessed by the user to determine a color-palette preference for the user. For example, a set of colors representing the web pages are assigned as the color-palette preference, at which one or more color palettes can be identified based on the color-palette preference. In some instances, the color-palette preference is used to identify one or more color schemes of the color palettes, such that the user interface of the client application presents the color palettes corresponding to the identified color schemes.

At step 412, the content-prediction application selects one or more color palettes based on the color-palette preference. For example, the content-prediction application identifies a color of the color-palette preference and convert the color into a database query. The content-prediction application can submit the query to a database in the server system (e.g., the color-palette content 114 of FIG. 1) to retrieve a set of color palettes that include the color specified in the database query. Process 400 terminates thereafter.

(b) Predicting Color-Palette Preference Based on Neural Networks

Figure 5:
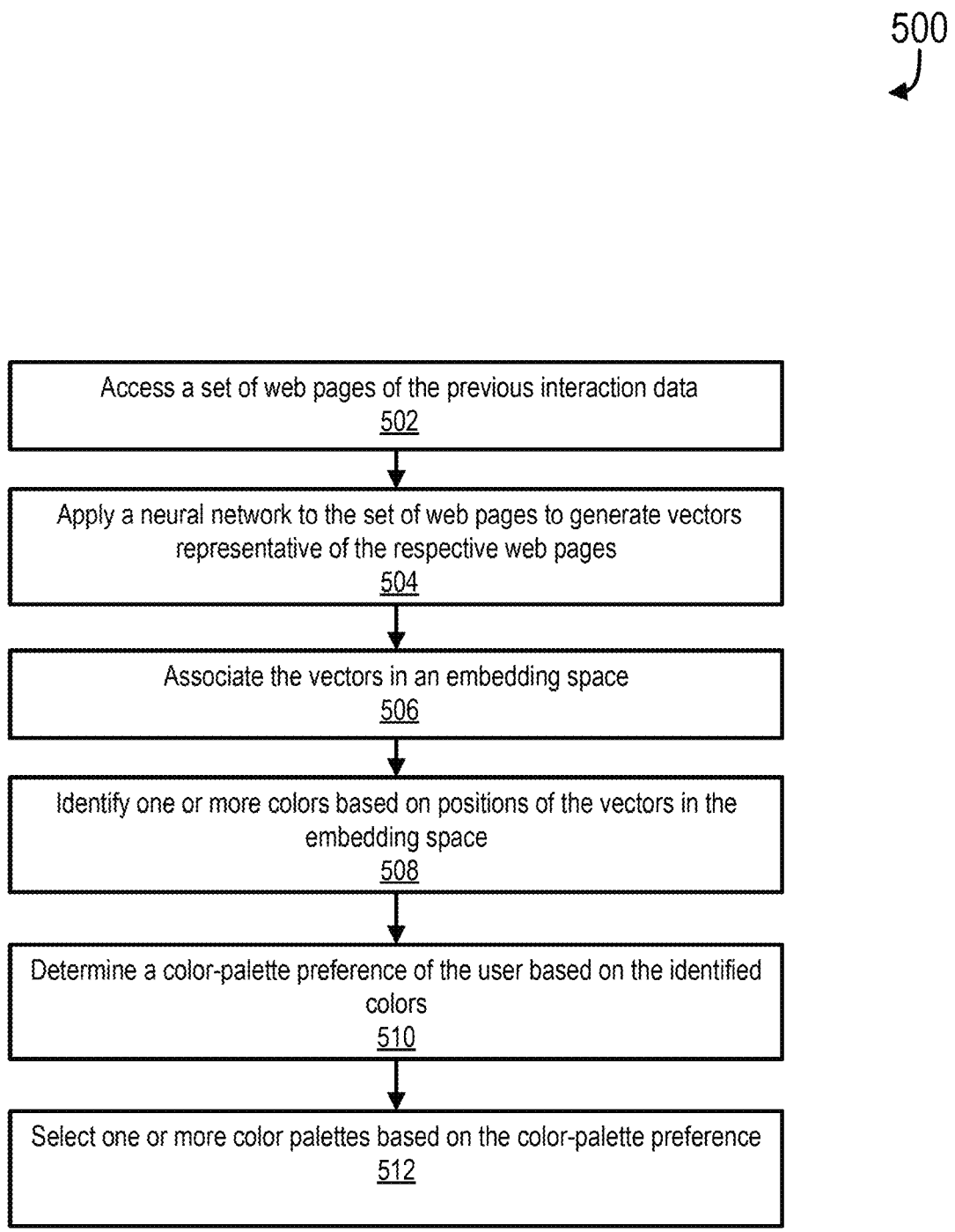
FIG. 5 illustrates a process for selecting color palettes based on applying neural networks to previous interaction data in accordance with the embodiments.

FIG. 5 illustrates a process 500 for selecting color palettes based on applying neural networks to previous interaction data in accordance with the embodiments. For illustrative purposes, the method 500 is described with reference to the components illustrated in FIG. 1, though other implementations are possible. For example, the program code for content-prediction application 115 of FIG. 1, which is stored in a non-transitory computer-readable medium, is executed by one or more processing devices to cause the server system 102 to perform one or more operations described herein.

At step 502, a content-prediction application (e.g., the content-prediction application 115 of FIG. 1) accesses a set of web pages of the previous interaction data. At step 504, the content-prediction application applies a neural network (e.g., an artificial neural network) to the set of web pages to generate vectors representative of the respective web pages. In some instances, the neural network (e.g., a multilayer deep neural network) trained with website data can be applied to a web page (e.g., a web page) of the previous interaction data. For example, each word appearing in the web page is assigned as an input value for a set of input values, and the input values are applied to the neural network to generate an m-dimensional vector representative of the web page.

At step 506, the content-prediction application associates the vectors in an embedding space. In some instances, web pages of the vectors that share common colors are located in close proximity to one another in the embedding space. For example, a high-dimensional, sparse vector includes a large set of values corresponding to the text data of the web page, in which each value of the set represents a separate English word of a dictionary. The large set may include a million elements to represent a million discrete words. Processing vectors with millions of elements may be inefficient especially if computing resources of a given system is limited. To reduce the dimensionality of the vector, the neural network model can process the text data in the web page such that a limited dimension of values can be identified for the vector. In effect, words of the web page can be semantically encoded using as attributes identified by the trained neural networks. The vector may thus capture the color context of the web page.

Additionally or alternatively, other vectors derived from other users' previous interaction data can be plotted in the embedding space based on collaborative filtering. The collaborative filtering can allow predictions of the user's color-palette preference based on the historical user activity of other users. For example, each of the web pages accessed by various users is applied with the neural-network machine-learning model to generate a set of values, then the set of values for each web page can embedded in the same embedding space as the embedding space that includes the vectors that represent web pages accessed by the user. This allows the color-palette preference to be selected not only based on the user's previous interaction data, but also on a collective color preference of a group of users. Examples of collaborative filtering may include, but are not limited to, techniques like matrix factorization, single-value decomposition, neural collaborative filtering, and neural factorization machines.

At step 508, the content-prediction application identifies one or more colors based on positions of the vectors in the embedding space. In some instances, the color can be identified by calculating distances between vectors (e.g., Euclidean, Minkowski distance, Hamming distance, cosine distance/similarity) and identifying a position in which the nearest distance among the vectors, in a manner similar to techniques implemented in a Support Vector Machine. Graph coordinates of the identified position can be converted into a set of pixel values that correspond to the identified color. In some instances, another neural network model is applied to the graph coordinates of the identified position to infer the set of pixel values that correspond to the identified color.

Additionally or alternatively, the distance metric between vectors for identifying color-palette preference may be determined by calculating an Earth Mover's Distance (EMD) value between the vectors. In this implementation, the neural network generates a plurality of vectors that represent the web page, instead of a single vector representing the web page as the above implementation. After the plurality of vectors for each web page are plotted in the embedding space, the EMD between two vectors representing two web pages can be determined based on semantic distances between words in the respective web pages, where words can be accessed from an electronic lexical database called WordNet. Once the semantic distances between words are obtained, the EMD calculates the similarity between two web pages with a many-to-many matching between words. For example, three words in one web page are equivalent in meaning to just one word in the other web page. The EMD that is less than a predetermined threshold can be formed into different clusters. Afterwards, each cluster is processed to identify a color that can assigned as a color-matching preference.

At step 510, the content-prediction application determines a color-palette preference of the user based on the identified colors. At step 512, the content-prediction application selects one or more color palettes based on the color-palette preference. Similar to implementations described in FIG. 4, the content-prediction application can identify a color of the color-palette preference and convert the color into a database query. The content-prediction application can submit the query to a database in the server system (e.g., the color-palette content 114 of FIG. 1) to retrieve a set of color palettes that include the color specified in the database query. Process 500 terminates thereafter.

Predicting Content Items Using Convolutional Neural Network with Embedding Layers A content-prediction application (e.g., the content-prediction application 115 of FIG. 1) may receive the color palette, which can either be selected by a user or predicted based on previous interaction data. The content-prediction application may process the color palette to predict one or more content items. A content item can include one or more colors that match the color(s) specified in the color palette. The content item may be identified by comparing a degree of similarity between color-palette vectors that represent one or more colors of the color palette and content vectors that represent the content items. Once the content items are identified, a catalog that includes the identified content items can be generated. In some instances, user-interface elements of a client application can be relocated such that the user-interface elements associated with the content items are positioned at a visible portion of a user interface.

(a) Conversion of Color Palettes into Color-Palette Vectors of the Color-Embedding Space In some embodiments, the content-prediction application generates a color-palette vector based on a set of pixel values that represent a color of the color palettes. In addition, the content-prediction application may continue to generate color-palette vectors for each of the other colors of the color palettes, in which the color may be associated with same or different color-palette categories. As such, the color palette can be represented by a set of color-palette vectors that can be identified in the color-embedding space. For example, the content-prediction application selects a color associated with a main color-palette category or a neutral color-palette category of the color palette. The color can be a portion of the image that represents the color palette. In some instances, the color is identified based on metadata associated with the color palette. The color can be processed to identify the set of pixel values. If the color is identified based on the portion of the image, the content-prediction application may select a pixel within the portion at a particular row and column and identify the pixel values corresponding to the pixel. In some instances, sets of pixel values are identified for each color in the color palette.

The content-prediction application may generate a color-palette vector based on the set of pixel values, in which the color-palette vector represents the color at a first location within a color-embedding space. The color-palette vector may include a set of graph coordinates for identifying the location of the color-palette vector at the color-embedding space. Two color-palette vectors having similar graph coordinate values in the color-embedding space may indicate that a higher degree of similarity relative to other vectors in the color-embedding space. In some instances, the content-prediction application applies a set of parameters (e.g., weights) to the generated color-palette vector based on a type of color-palette category. A content item can be predicted not only based on its color that corresponds to one or more colors of the color-palette, but also on the type of color-palette category that is associated with the one or more colors of the color-palette.

Additionally or alternatively, a word-embedding neural network is applied to one or more word tokens describing the color to generate the color-palette vector, instead of extracting the set of pixel values. For example, the one or more word tokens identify a word "red" or multiple words such as "greenish blue." Different types of word-embedding neural network can be used to generate the color-palette vector from the word token, which may include neural-net language models (NNLM), global vectors for word representation (GloVe), deep contextualized word representations (ELMo), and Word2vec, or any other machine-learning techniques trained and configured to process word tokens to generate color-palette vectors.

Figure 6:
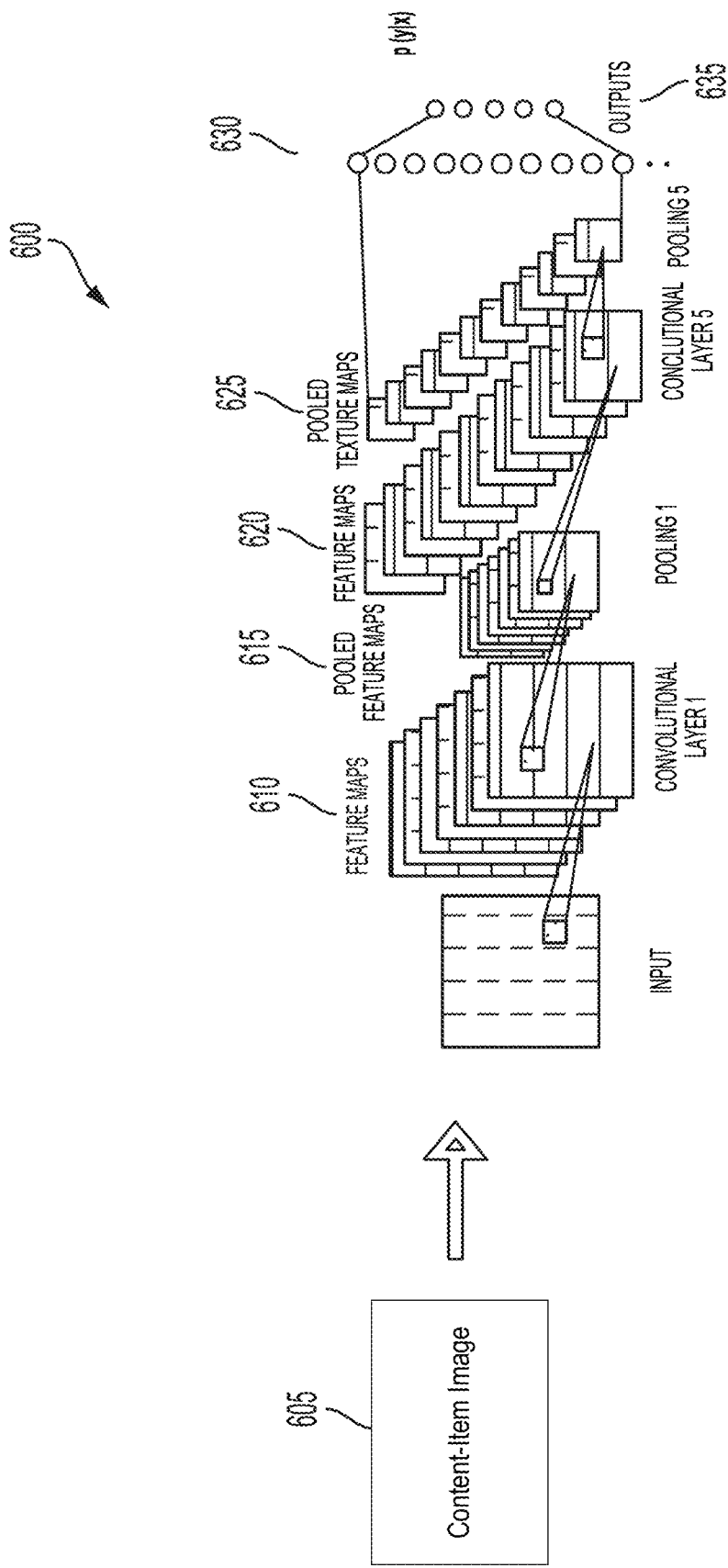
FIG. 6 illustrates a schematic diagram for using convolutional neural networks to predict color signatures of content items in accordance with some embodiments.

(b) Prediction of Color Signatures of Content Items Based on Convolutional Neural Network Models FIG. 6 illustrates a schematic diagram 600 for using convolutional neural networks to predict color signatures of content items in accordance with some embodiments. For illustrative purposes, the process implemented in the schematic diagram 600 is described with reference to the components illustrated in FIG. 1, though other implementations are possible. For example, the program code for content-prediction application 115 of FIG. 1, which is stored in a non-transitory computer-readable medium, is executed by one or more processing devices to cause the server system 102 to perform one or more operations described herein.

A content-item image 605 can be provided to the content-prediction application configured to apply one or more layers of a deep convolutional neural network (DCNN) model. The content-item image 605 may be structured as one or more arrays or matrices of pixel values. In some instances, pixel value corresponding to a given pixel position is associated with (for example) a general intensity value and/or an intensity value as it pertains to each of one or more colors (e.g., RGB values).

The content-prediction application can perform a series of operations on the pixel values corresponding to the content-item image 605, which form a single convolutional layer for several types of DCNN architectures: (1) convolution; (2) non-linearity conversion (e.g., ReLU); (3) pooling or sub sampling; and (4) classification (e.g., Fully Connected Layer). In some instances, convolution operation of the content-prediction application preserves the spatial relationship between pixels by learning image features using small squares of input data. For example, the content-item image 605 is considered as a matrix of pixel values, in which each pixel area of the matrix can be assigned with values. In addition, the content-item image 605 can be a black-and-white image having pixel values ranging from 0 and 1. The content-item image 605 may alternatively or additionally include color images that have three assigned RGB values ranging from 0 and 255.

After the content-item image 605 is accessed, the content-prediction application may generate a feature map 610 based on the content-item image 605. In some embodiments, the feature extractor includes one or more kernels or filters including a matrix of values that can "slide over" the matrix corresponding to the content-item image 605 so as to generate the feature map 610. For example, a kernel is configured to detect edges, sharpen the image, or identify sets of pixels that represent the subject in order to preprocess the data and provide details that are relevant for image analysis of the classifier. In some instances, a set of hyperparameters that correspond to the feature extraction are predefined (e.g., based on manual input). Feature-extraction hyperparameters may identify (for example) a stride for each filter (e.g., 1-step, 2-step), a padding size, a kernel size, and/or a kernel shape.

Continuing with the example of FIG. 6, the content-prediction application may perform a non-linearity (e.g., ReLU) conversion which replaces all negative pixel values in the feature map 610 by zero. The ReLU operation of the content-prediction application may introduce non-linearity in the DCNN model, as the convolution operation generates a linear function output from the matrix values representative of the content-item image 605. The non-linearity conversion may additionally or alternatively include using sigmoid function and/or tan h function.

After the ReLU operation, the content-prediction application can perform a pooling operation on the feature map 610 in order to reduce the spatial size of the feature map 610 and subsequently generate a pooled feature map 615. In some embodiments, pooling reduces the dimensionality of each feature map generated by the kernel of the feature extractor but retains the image-defining features (e.g., edges of an image) captured in the content-item image 605. In some instances, the content-prediction application performs a max pooling operation to access an area within the feature map (e.g., 5×5 matrix within the feature map) and selects the element associated with the highest value. This operation can be iterated to traverse the entirety of the feature map 610, at which the max pooling operation completes the generation of the pooled feature map 615. The content-prediction application may alternatively or additionally perform an average pooling operation in place of the max pooling operation which selects the sum or average value of the elements captured in the area within the feature map 610. By performing the pooling operations, the content-prediction application may achieve several technical advantages including capability of generating an input representation of the content-item image 605 that allows reduction of number of parameters and computations within the CNN model, as well scaling of invariant represent of the content-item image 605.

Continuing with the example of FIG. 6, the content-prediction application may continue to apply one or more additional convolutional layers on the content-item image 605 at which convolution, ReLU, and pooling operations can be performed on the pooled feature map 615. In some instances, the second convolution layer generates a feature map 620, a pooled feature map 625, and so forth. These operations are repeated until the extracted features become equivariant to the scale and translation of the fully connected layer.

After applying several convolutional layers, the content-prediction application may apply a fully connected layer 630, which may be a multi-layer perceptron network incorporating a softmax activation function or other types of linear or non-linear functions at an output layer 635. In some embodiments, the content-prediction application uses the fully connected layer that accesses the extracted features and generates an output that includes a color signature that corresponds to the content-item image 605. In some instances, the color signature is a vector that includes an array of values that specify visual characteristics of the content-item image 605. Thereafter, the output and the labels of the training dataset can be used as input for loss functions which process them to optimize the parameters in the DCNN model. For instance, the content-item image 605 can be classified by the content-prediction application to predict its color signature, such that a content vector generated based on the color signature can be compared with the color-palette vector to identify a degree of similarity. In some instances, the content-prediction application additionally predicts whether the content item of the content-item image 605 should be associated with a color-palette category, such as a main color-palette category, a neutral color-palette category, and an accent color-palette category. Values of the content vector generated from the color signature can be modified by applying one or more weight parameters, in which a value of the weight parameter is dependent of the type of color-palette category predicted for the particular content item. Any error value from the output layer 635 (e.g., output data specifying wrong color signature) can be calculated based on comparing the values from the output layer 635 and the labels in the training data. The error value can then be used in backpropagation algorithms to adjust the parameters in the DCNN model and thus improve the accuracy of subsequent outputs determined by the classifier.

It will be appreciated that, while FIG. 6 depicts using two convolutional layers to process the content-item image 605, different numbers of convolutional layers may be used (e.g., which may have an effect of repeating these operations can be repeated by the content-prediction application one or more times). For example, outputs are determined by applying 10 or more convolutional layers to extract features from the content-item image 605. In some embodiments, pooling operations are omitted for one or more convolutional layers applied by the classifier. In some embodiments, different versions of the DCNN model architecture are used by the classifier, including but not limited to AlexNet, ZFNet, GoogLeNet, VGGNet, ResNets, DenseNet, etc.

In some instances, the content-item image 605 is processed by the content-prediction application without applying the fully connected layer 630 of the DCNN model. As such, the output from the layers of the DCNN model can be used as the color signature of the content-item image 605. The color signature can be used to generate a content vector that can represent the content-item image 605. The content vector may include graph coordinates for identifying a location (e.g., location coordinates) of the content item in the color-embedding space. In some instances, an embedding layer is applied to the content vector to reduce the dimensionality of the embedding vector. For example, the content vector representative of the color signature of the content item is associated with values having 20 dimensions, at which the embedding layer can reduce the dimensions of the values to 10. In some instances, multiple content vectors are generated for the content-item image 605 that includes multiple colors (e.g., a checkered pattern including beige, brown, black colors).

(c) Predicting Content Based on Color-Embedding Space

Once the color signature is generated for the content-item image 605, the content vector of the content-item image 605 can be plotted in the color-embedding space, at which the embedding vector is compared with color-palette vectors in the color-embedding space. The content vectors of a plurality of content-item images can be compared with each of the color-palette vectors to generate a set of distance metrics, that is indicative of a degree of similarity between the colors of the content-item image 605 and a given color of the color palette. The distance metric can be a Euclidean distance calculated between the embedding vectors.

In some embodiments, the distance metric between two vectors includes other types of metrics including, but are not limited to, Minkowski distance, Hamming distance, and cosine distance/similarity. For example, the Euclidean distance d(A, B) is calculated for a color-palette vector representative of the color palette $A=[a_1, a_2, \ldots, a_n]$ and a content vector representative of a content item of the catalog $B=[b_1, b_2, \ldots b_n]$. A lower Euclidean distance value may indicate a higher degree of similarity between vectors A and B.

$$d(A,B)=\sqrt{(a_1-b_1)^2+(a_2-b_2)^2+\ldots+(a_n-b_n)^2}$$

In another example, the cosine similarity $\theta(A, B)$ is calculated for a color-palette vector representative of the color palette $A=[a_1, a_2, \ldots, a_n]$ and a content vector representative of an item of the catalog $B=[b_1, b_2, \ldots b_n]$. A higher cosine value may indicate a higher degree of similarity between vectors A and B.

$$\theta(A, B) = \frac{A*B}{\|A\|*\|B\|}$$

In some instances, each vector having a distance metric lower than a predetermined threshold is identified, and the item corresponding to the vector is selected to be displayed on the user interface. If the distance metric corresponds to a cosine similarity, the content item can be selected if the distance metric exceeds the predetermined threshold. Additionally or alternatively, the set of items can be ranked based on their respective distance metrics, from the lowest distance metric value to the highest distance metric value. The catalog can be generated such that the set of items are presented in accordance with the determined rankings.

If the content item is represented by set of content vectors, the content-prediction application calculates a distance metric (e.g., the Euclidean distance) between each of the set of content vectors and its nearest color-palette vector in the color embedding space, thereby generating a set of distance metrics. An average or a median value of the set of distance metrics can be calculated, which is then identified whether such value is less than the predetermined threshold. If so, the content-prediction application can select the content item (e.g., a sofa with checkered pattern having red, pink, and white colors) represented by the average or median value of the set of distance metrics.

Example of a Computing Environment

Figure 7:
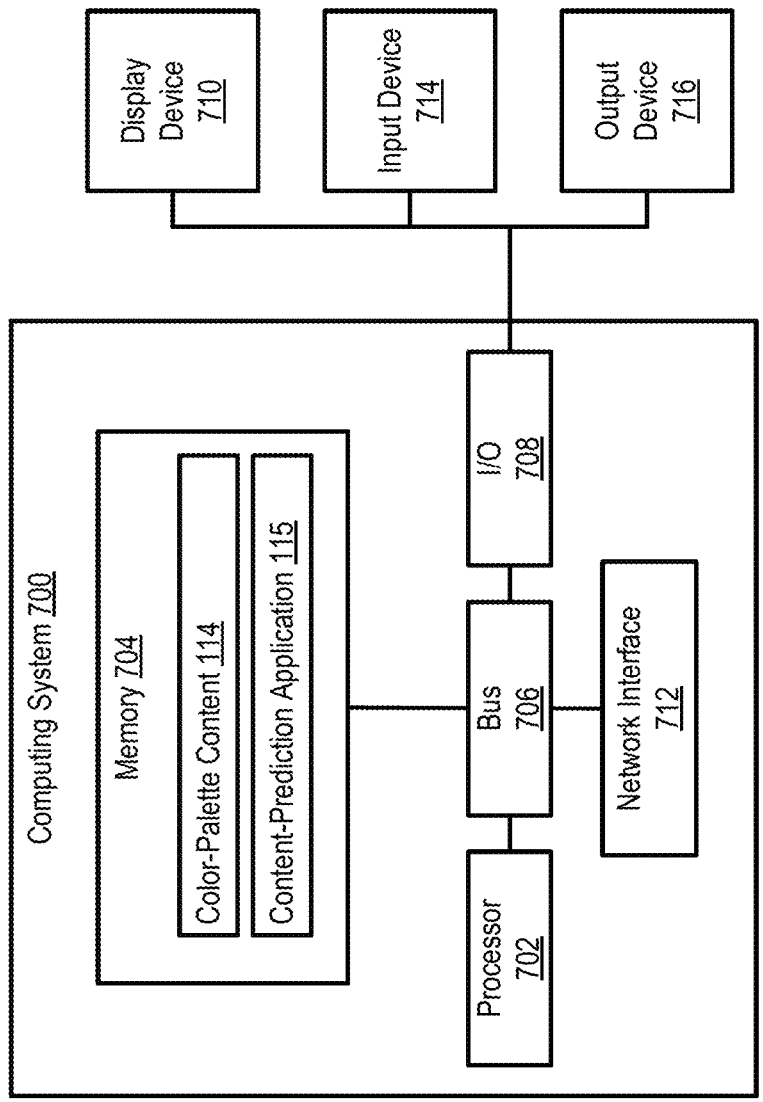
FIG. 7 depicts a computing system configured for predicting content based on pixel-based vectors in accordance with some embodiments.

Any suitable computing system or group of computing systems can be used for performing the operations described herein. For example, FIG. 7 depicts a computing system 700 that can implement any of the computing systems or environments discussed above. In some embodiments, the computing system 700 includes a processing device 702 that executes the content-prediction application 115 including the content-prediction application 115, a memory that stores various data computed or used by the content-prediction application 115, an input device 714 (e.g., a mouse, a stylus, a touchpad, a touchscreen, etc.), and an output device 716 that presents output to a user (e.g., a display device that displays graphical content generated by the content-prediction application 115). For illustrative purposes, FIG. 7 depicts a single computing system on which the content-prediction application 115 is executed, and the input device 714 and output device 716 are present. But these applications, datasets, and devices can be stored or included across different computing systems having devices similar to the devices depicted in FIG. 7.

The example of FIG. 7 includes a processing device 702 communicatively coupled to one or more memory devices 704. The processing device 702 executes computer-executable program code stored in a memory device 704, accesses information stored in the memory device 704, or both. Examples of the processing device 702 include a microprocessor, an application-specific integrated circuit ("ASIC"), a field-programmable gate array ("FPGA"), or any other suitable processing device. The processing device 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as a display device 710, or other input or output devices. For example, the computing system 700 is shown with one or more input/output ("I/O") interfaces 708. An I/O interface 708 can receive input from input devices or provide output to output devices. One or more buses 706 are also included in the computing system 700. Each bus 706 communicatively couples one or more components of the computing system 700 to each other or to an external component.

The computing system 700 executes program code that configures the processing device 702 to perform one or more of the operations described herein. The program code includes, for example, code implementing the content-prediction application 115 or other suitable applications that perform one or more operations described herein. The program code may be resident in the memory device 704 or any suitable computer-readable medium and may be executed by the processing device 702 or any other suitable processor. In some embodiments, all modules in the content-prediction application 115 are stored in the memory device 704, as depicted in FIG. 7. In additional or alternative embodiments, one or more of these modules from the content-prediction application 115 are stored in different memory devices of different computing systems.

In some embodiments, the computing system 700 also includes a network interface device 712. The network interface device 712 includes any device or group of devices suitable for establishing a wired or wireless data connection to one or more data networks. Non-limiting examples of the network interface device 712 include an Ethernet network adapter, a modem, and/or the like. The computing system 700 is able to communicate with one or more other computing devices (e.g., a computing device that receives inputs for content-prediction application 115 or displays outputs of the content-prediction application 115) via a data network using the network interface device 712.

An input device 714 can include any device or group of devices suitable for receiving visual, auditory, or other suitable input that controls or affects the operations of the processing device 702. Non-limiting examples of the input device 714 include a touchscreen, stylus, a mouse, a keyboard, a microphone, a separate mobile computing device, etc. An output device 716 can include any device or group of devices suitable for providing visual, auditory, or other suitable sensory output. Non-limiting examples of the output device 716 include a touchscreen, a monitor, a separate mobile computing device, etc.

Although FIG. 7 depicts the input device 714 and the output device 716 as being local to the computing device that executes the content-prediction application 115, other implementations are possible. For instance, in some embodiments, one or more of the input device 714 and the output device 716 include a remote client-computing device that communicates with the computing system 700 via the network interface device 712 using one or more data networks described herein.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
   accessing a color palette that includes two or more color-palette categories;
   selecting a first color of a color-palette category of the two or more color-palette categories;
   identifying a set of pixel values that characterize the selected first color;
   generating, based on the set of pixel values of the selected first color, a first vector that represents the first color at a first location within a color-embedding space;
   identifying a second vector specifying a second location within the color-embedding space, wherein the second vector is identified by applying a convolutional neural network model on an image depicting an item that includes a second color, wherein applying the convolutional neural network model to the image to generate the second vector includes:
      applying an convolutional layer of the convolutional neural network model to a set of pixels of the image to generate a first set of values that represent the set of pixels, the first set of values including a first number of values;
      applying an embedding layer of the convolutional neural network model to the first number of values to generate a second set of values that represent the set of pixels of the image, wherein the second set of values includes a second number of values that is less than the first number; and
      generating the second vector that includes the second set of values, wherein the second set of values indicate location coordinates of the second location within the color-embedding space;
   determining that a distance metric between the first vector and the second vector is less than a predetermined threshold, wherein the predetermined threshold indicates a degree of color similarity between the first vector and second vector;
   selecting, based on the distance metric being less than the predetermined threshold, the item that includes the second color; and
   generating, for output on a user interface, an item catalog that includes the selected item.

2. The method of claim 1, wherein accessing the color palette includes:
   receiving interaction data indicative of historical user activity that occurred via a browser application;
   applying a machine-learning model to the interaction data to infer a color-palette preference of a user associated with the interaction data;
   determining that the color palette matches the color-palette preference; and
   accessing the color palette.

3. The method of claim 2, further comprising, prior to applying the machine-learning model to the interaction data:
   identifying an image object to which at least some of the historical user activity was directed; and extracting pixels values of the identified image object, wherein the machine-learning model identifies, from the extracted pixel values, two or more colors associated with the color-palette preference.

4. The method of claim 1, wherein the distance metric is a cosine distance between the first vector and the second vector.

5. The method of claim 1, wherein the distance metric is a Euclidean distance between the first vector and the second vector.

6. The method of claim 1, wherein the color-palette is associated with a first color scheme.

7. A system comprising:
one or more processors; and
a memory having stored thereon instructions that, upon execution by the one or more processors, cause the one or more processors to:
 access a color palette that includes two or more color-palette categories;
 select a first color of a color-palette category of the two or more color-palette categories;
 identify a set of pixel values that characterize the selected first color;
 generate, based on the set of pixel values of the selected first color, a first vector that represents the first color at a first location within a color-embedding space;
 identify a second vector specifying a second location within the color-embedding space, wherein the second vector is identified by applying a convolutional neural network model on an image depicting an item that includes a second color, wherein applying the convolutional neural network model to the image to generate the second vector includes:
  applying an convolutional layer of the convolutional neural network model to a set of pixels of the image to generate a first set of values that represent the set of pixels, the first set of values including a first number of values;
  applying an embedding layer of the convolutional neural network model to the first number of values to generate a second set of values that represent the set of pixels of the image, wherein the second set of values includes a second number of values that is less than the first number; and
  generating the second vector that includes the second set of values, wherein the second set of values indicate location coordinates of the second location within the color-embedding space;
 determine that a distance metric between the first vector and the second vector is less than a predetermined threshold, wherein the predetermined threshold indicates a degree of color similarity between the first vector and second vector;
 select, based on the distance metric being less than the predetermined threshold, the item that includes the second color; and
 generate, for output on a user interface, an item catalog that includes the selected item.

8. The system of claim 7, wherein instructions to access the color palette further comprises instructions that, upon execution by the one or more processors, cause the one or more processors to:
 receive interaction data indicative of historical user activity that occurred via a browser application;
 apply a machine-learning model to the interaction data to infer a color-palette preference of a user associated with the interaction data;
 determine that the color palette matches the color-palette preference; and
 access the color palette.

9. The system of claim 8, wherein the instructions, upon execution by the one or more processors, further cause the one or more processors to:
 identify an image object to which at least some of the historical user activity was directed; and
 extract pixel values of the identified image object, wherein the machine-learning model identifies, from the extracted pixel values, two or more colors associated with the color-palette preference.

10. The system of claim 7, wherein the distance metric is a cosine distance between the first vector and the second vector.

11. The system of claim 7, wherein the distance metric is a Euclidean distance between the first vector and the second vector.

12. The system of claim 7, wherein, wherein the color-palette is associated with a first color scheme.

13. A computer program product tangibly embodied in a non-transitory machine-readable storage medium, including instructions configured to cause one or more data processors to perform actions including:
 accessing a color palette that includes two or more color-palette categories;
 selecting a first color of a color-palette category of the two or more color-palette categories;
 identifying a set of pixel values that characterize the selected first color;
 generating, based on the set of pixel values of the selected first color, a first vector that represents the first color at a first location within a color-embedding space;
 identifying a second vector specifying a second location within the color-embedding space, wherein the second vector is identified by applying a convolutional neural network model on an image depicting an item that includes a second color, wherein applying the convolutional neural network model to the image to generate the second vector includes:
  applying an convolutional layer of the convolutional neural network model to a set of pixels of the image to generate a first set of values that represent the set of pixels, the first set of values including a first number of values;
  applying an embedding layer of the convolutional neural network model to the first number of values to generate a second set of values that represent the set of pixels of the image, wherein the second set of values includes a second number of values that is less than the first number; and
  generating the second vector that includes the second set of values, wherein the second set of values indicate location coordinates of the second location within the color-embedding space;
 determining that a distance metric between the first vector and the second vector is less than a predetermined threshold, wherein the predetermined threshold indicates a degree of color similarity between the first vector and second vector;
 selecting, based on the distance metric being less than the predetermined threshold, the item that includes the second color; and
 generating, for output on a user interface, an item catalog that includes the selected item.

14. The computer program product of claim 13, wherein instructions to access the color palette further comprises instructions that, upon execution by the one or more data processors, cause the one or more data processors to perform actions including:
- receiving interaction data indicative of historical user activity that occurred via a browser application;
- applying a machine-learning model to the interaction data to infer a color-palette preference of a user associated with the interaction data;
- determining that the color palette matches the color-palette preference; and
- accessing the color palette.

15. The computer program product of claim 14, wherein the instructions further cause the one or more data processors to perform actions including:
- identifying an image object to which at least some of the historical user activity was directed; and
- extracting pixels values of the identified image object, wherein the machine-learning model identifies, from the extracted pixel values, two or more colors associated with the color-palette preference.

16. The computer program product of claim 13, wherein the distance metric is a cosine distance between the first vector and the second vector.

17. The computer program product of claim 13, wherein the distance metric is a Euclidean distance between the first vector and the second vector.

* * * * *